United States Patent [19]
Wallace et al.

[11] Patent Number: 5,103,457
[45] Date of Patent: Apr. 7, 1992

[54] ELLIPTICAL MODE CAVITIES FOR SOLID-STATE LASERS PUMPED BY LASER DIODES

[75] Inventors: Richard W. Wallace, Los Altos; Kurt J. Weingarten, Palo Alto; David C. Shannon, Sunnyvale, all of Calif.

[73] Assignee: Lightwave Electronics Corporation, Mount view, Calif.

[21] Appl. No.: 478,812

[22] Filed: Feb. 7, 1990

[51] Int. Cl.$^5$ .............................................. H01S 3/08
[52] U.S. Cl. .................................... 372/92; 372/75; 372/107; 372/99
[58] Field of Search ............... 372/92, 93, 75, 107, 372/98, 99, 108, 101

[56] References Cited

U.S. PATENT DOCUMENTS

4,866,730 9/1989 Szatmari et al. .................. 372/101

*Primary Examiner*—Leon Scott, Jr.

[57] ABSTRACT

A diode pumped solid-state laser is disclosed having: a block of a lasing gain material with at least two optical surfaces and a cavity means positioned around the block to define a laser cavity which includes a mode shaping means to form an eliptical resonator mode between the optical faces within the block; a high aspect ratio pumping laser diode light source is positioned outside one of said optical faces; and a means to image the pumping light beam from said source to substantially match the elliptical resonator mode.

28 Claims, 5 Drawing Sheets

ELLIPTICAL MODE CAVITIES FOR SOLID-STATE LASERS PUMPED BY LASER DIODES

BACKGROUND OF THE INVENTION

1. Technical Field

This invention relates to diode-pumped lasers and more specifically to configurations of resonator cavities for solid-state lasers.

2. Discussion of the Prior Art

Laser diode light emissions are commonly dedicated to "pumping" gain materials to achieve lasing in larger host cavities which in turn output continuous waves or pulses of light. Laser diode side-pumping complicates controlling transverse modes of lasing in solid-state gain materials such as 1% neodymium-doped yttrium aluminum garnet (Nd:YAG) or yttrium lithium fluoride (Nd:YLF), but end-pumping facilitates controlling transverse modes. Laser diode light pumped into a solid-state gain material is converted along the light's "absorption length" (typically four to five mm) most efficiently within an axially cylindrical TEM$_{00}$ mode volume through the gain material. Solid-state laser gain "G" is inversely proportional to the sum of the cross-sectional areas of the pumping beam $A_p$ and of the cavity mode $A_c$:

$$G = k \frac{1}{A_p + A_c}$$

Higher power laser diodes have light-emitting junctions or "slits" which are dimensioned non-symmetrically, typically one micron high vertically and many times as long horizontally. Laser diodes pump light in beams which diverge non-symmetrically, typically ten degrees horizontally and fifty degrees vertically full-width at half-maximum intensity ("FWHM"). Any laser diode pump light beams which diverge more widely than ten degrees beyond their "waists" spread, through several millimeters, to objectionably broad spots. Fortunately, a laser diode beam initially only one micron high can afford to have its short vertical height increased by magnification five times in a trade-off to achieve having its excessive vertical divergence decreased by collimation from fifty degrees inward to ten degrees, to be suitable for imaging axially into a TEM$_{00}$ mode volume.

Non-symmetrically divergent elliptical beams having their collimations improved by vertical magnification fortuitously tend to become rounder. Minimally elliptical beams (i.e., those with short, say ≦ several hundred micron, lengths not dominating their heights) undergoing vertical magnification become fairly circular. Diode pump beam-rounding distributes light energy more uniformly, and thereby reduces thermal focusing and gain-guiding effects in pumped mode volumes of solid-state laser cavities, which in consequence reduces distortions in output beams.

Laser output beams are preferably circular for applications in general. The transverse shape of a laser output beam corresponds to that of the lasing mode beam inside the cavity at the out-coupling mirror. This predisposes solid-state laser designers to specify cavities for resonating in cross-sectionally circular modes. To match circular mode areas, pumping beams are preferably also circular in cross-section.

Non-symmetrically divergent light beams may be re-shaped for example by passage through a cylindrical lens or a prism, or by reflections against a pair of concave mirrors oriented off-axis as described in U.S. patent application Ser. No. 185,466, filed Apr. 25, 1988 and assigned to the assignee of this application. Optical cavities have also used prisms for different purposes, for example tilted steeply in "An Improved Line Narrowing Technique for a Dye Laser Excited by a Nitrogen Laser," *Optical Communications* vol. #4 pg. 187 (1971).

Laser output beams have been made more powerful conventionally by cavities being pumped with laser diodes in turn made more powerful through their junctions being lengthened proportionately. Laser diode powers and operational lifetimes also have been further increased by arranging multiple arrays side-by-side to form long "bars". For example, thirty discrete one hundred micron-long diode arrays are aligned on 333 micron centers in ten-watt bar model SDL 3490-S from the Spectra Diode Labs. Such a diode-array bar has a slit with a very high aspect ratio of one micron high by one centimeter long.

Unfortunately however, laser-diode radiations are not diffraction-limited, i.e. longer diode pump beams do not have narrower divergences. An optical system which images a laser diode pump beam by horizontally reducing its length simultaneously increases its divergence so that before the pumping light can be entirely absorbed, the beam expands beyond the diameter of the fundamental (TEM$_{00}$) mode area in a solid-state gain medium. This results either in lasing in higher transverse modes or, in cavities restricted to the fundamental mode (for example by an aperture), less efficient lasing.

Despite thermal effects and gain-guiding considerations, thin elliptical laser diode beams can be used to pump solid-state lasing gain cavities. U.S. Pat. No. 4,653,056 by Baer describes multi-strip arrays of diodes which emit light compiled into beams possessing too much spacial structure and having poor focusing qualities (col. 2 lines 52–61). This disadvantage may be addressed by configuring a cavity to expand its lasing mode diameter to match the long diameter of the focused image of the pump beam, which allows utilizing longer diode bars with higher powers. However, Baer considers only circular modes.

Increases in diode pump power accompanied by proportional increases in diode length dictate equal increases in diameters of circular modes in end-pumped solid-state lasers. Since solid-state laser gain G is inversely proportional to the cross-sectional area $A_c$ of the cavity mode volume, diode pump power-increases accompanied by length-increases are traded off against gain decreases. This poses dilemmas in making longer diode arrays or array-bars to be compatible for end-pumping conventional solid-state laser cavities.

Laser diodes in discrete arrays arranged either serially along a bar or individually can be used to pump light into ends of optical fibers, which can in turn either separately couple the light into multiple-bounce point cavities (see *Optics Letters*, Vol. 13, No. 4, pg. 306, April 1988), or be bundled together to couple the light into single- or multiple-end cavities.

U.S. Pat. No. 4,785,459 by Baer describes multiple laser diode arrays each two hundred microns long centered one mm apart along a bar. The bar must be precisely and meticulously aligned to couple the light from the diodes into respective bounce points also one m apart along a multi-bounce solid-state gain element of Nd:YAG.

There remains, therefore, a need for a laser cavity configuration to facilitate converting longer laser diode pump light beams efficiently and conveniently into TEM$_{00}$ lasing output energy.

SUMMARY OF THE INVENTION

The present invention provides a laser resonator cavity including a solid-state lasing gain element and astigmatic means for refracting the lasing mode beam differently in its horizontal and vertical dimensions. The astigmatic means may be for example an anamorphic prism pair or a Brewster-angled planar surface. The astigmatic means has an active optical surface from which the cavity, in the direction towards the gain element, has a cross-sectionally elliptical mode volume. From this optical surface in the opposite direction, towards a front out-coupler, the cavity has a relatively circular mode volume. An out-coupler mirror reflects most of the lasing light in a circular mode beam back through the astigmatic means to be elongated into an elliptical cross-section mode beam which corresponds more closely to the elongated cross-sectional area of the laser diode pumping beam.

The invention optimizes elliptical pumping beam overlaps with TEM$_{00}$ mode beams at considerably higher power densities than those characteristic of typical circular mode cavities. The invention enables light pumped in long elliptical beams to be imaged simply into TEM$_{00}$ lasing volumes without sacrificing gain in solid-state lasers. A preferred ring laser embodiment enables diode pump beams which diverge much more than ten degrees to be absorbed inside the TEM$_{00}$ mode volume. These and other advantages of the present invention will become more apparent through a reading of the following Detailed Description with reference to the accompanying Drawing figures.

DETAILED DESCRIPTION OF THE INVENTION

To achieve higher lasing gain, a laser cavity configured according to the present invention expands the TEM$_{00}$ mode volume principally in its "horizontal" or tangential plane to match higher aspect ratios of longer beams of light pumped from higher power laser diodes. An elliptical mode can be introduced, for example, by use of either spherical reflectors oriented off-axis, astigmatic reflectors, cylindrical lenses, or, in cavities operating near instability, even simple, thick, tilted parallel-surface plates. Cavity mode expansion is preferably accomplished through a series of prisms.

Figure 1:
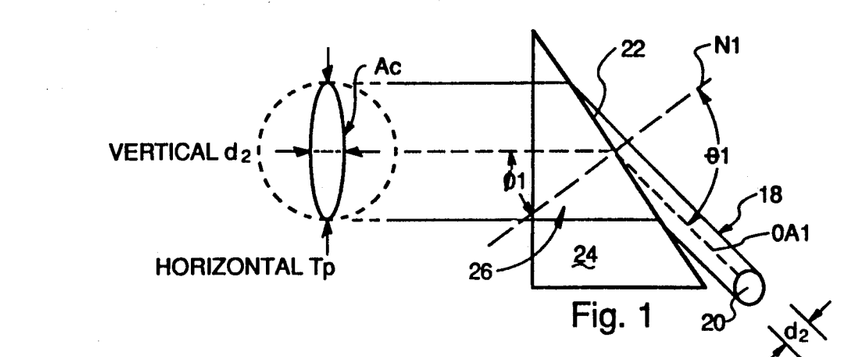
FIG. 1 illustrates the geometry of elongation occurring in a circular beam incident obliquely to a planar optical interface.

FIG. 1 illustrates a Gaussian mode beam 18 having a circular cross-section area 20 along optical axis OA1 at angle $\theta 1$ from normal axis N1 which, by oblique incidence leftward onto transparent planar surface 22, becomes transversely (horizontally) elongated. Circular mode beam 18 enters anamorphic prism 24, which has an index of refraction "n," and is deflected to angle $\phi 1$ from axis N1 and thereby horizontally elongated from diameter $d_2$ to diameter $d_1$ in its plane of incidence (i.e., the plane of the drawing sheet). Meanwhile, the vertical diameter $d_2$ remains constant in the elliptical cross-sectional area Ac of re-shaped mode beam 26. The angles $\phi$ and $\theta$ are related by Snell's law, while the two orthogonal diameters are related by the formula:

$$d_1 = d_2 * \cos\phi/\cos\theta$$

Long, thinly elongated mode beams 26 in solid-state gain media 24 maintain lasing gain G. Also, there is much more surface area to extract heat, and consequently elliptical mode 26 beneficially reduces thermal focusing problems. The heat flows out the vertical sides and leaves a uniform temperature along most of the long dimension of the pumped region.

Figure 2:
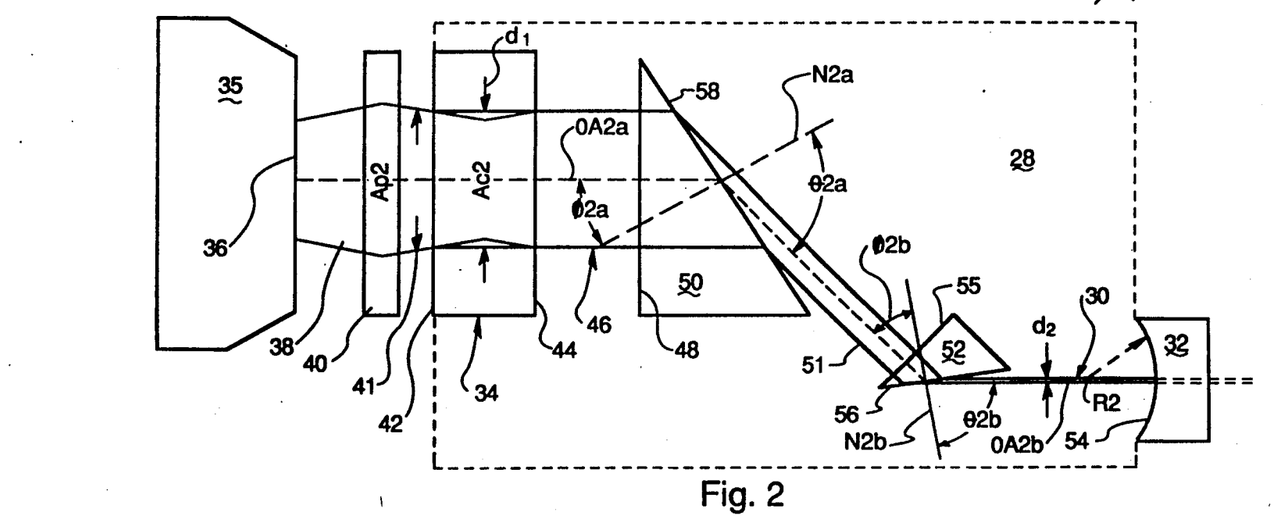
FIG. 2 represents a resonant cavity with an anamorphic prism pair which produces an elongated mode beam inside a solid-state lasing gain element.

FIG. 2 shows the invention in a first embodiment as a laser including a cavity indicated by dashed outline 28. The cavity lasing mode has, in cross-section, an essentially circular area in beam 30 along optical axis leg OA2b adjacent out-coupler 32, but has a relatively elliptical area Ac2 in beam 46 along axis leg OA2a through solid-state gain medium 34.

A laser diode 35 with an elongated slit 36 pumps light in a non-symmetrically diverging elliptical beam 38, which is focused and partially collimated through lens means 40 (including at least two lenses) and proceeds as beam 41 towards cavity 28. Solid-state gain medium 34 has its left ("back") end coated with a dielectric back-mirror element 42 which is highly ($\geq 90\%$) transmissive (HT) to the 808 nm wavelength of light pumped from the laser diode 35. Pump light beam 41 penetrates elliptical area Ap2 into, and continues along its absorption length inside, solid-state lasing gain medium 34.

Back-mirror element 42 is highly ($\geq 99.9\%$) reflective (HR) to the 1064 nm wavelength of light eventually lasing within solid-state gain medium 34, and thereby contains lasing light inside cavity 28. Solid-state gain medium 34 has, on its right ("front") end, a low ($\leq 0.1\%$) coefficient anti-reflection (AR) coating 44 suitable to pass lasing light in mode beam 46 along axis leg OA2a rightward at normal-incidence towards surface 48 of anamorphic prism 50.

Prisms 50 and 52 may be for example un-doped YAG crystals having an index of refraction n=1.82, and front-surfaces 58 and 56 with normal axes N2a and N2b at respective angles $\phi 2a$ and $\phi 2b$ of incidence through which successive mode beams 46 and 51 are shortened horizontally as they propagate rightward towards out-coupler 32. The optical surfaces 48, 58, 55 and 56 also have appropriate AR coatings.

Out-coupler 32 has its inner surface coated with a dielectric front-mirror element 54 which is partially transmissive to light at the lasing wavelength. Front-mirror element 54 has a concave curvature with a radius R2 and, in combination with the distance "D" (not marked) from the surface of front-mirror element 54 along optical axis OA2b through prisms 56 and 58 and then along axis OA2a to the surface of back-mirror element 42, determines the mode beam diameter $d_2$ in both circular area 30 (at output coupler 32) and along the vertical axis (as in FIG. 1) in elliptical area Ac2 inside gain medium 34.

Out-coupler 32 reflects a percentage of the lasing light back in circular mode beam 30 through prisms 52 and 50 to be horizontally re-shaped into elliptical mode beam 46. Lasing light reflected leftward along axis OA2b is successively incident at angles $\theta 2b$ and $\theta 2a$ each equal to eighty degrees from normal axes N2b and N2a of surfaces 56 and 58 on prisms 52 and 50, respectively. Optically active surfaces 56 and 58 are AR-coated preferably for "P" polarization. In theory, steeper angles $\theta$ of incidence to surfaces would induce greater elongations in mode beams, but steeper surfaces are harder to AR-coat for minimum losses.

In a cavity 28 having for example a length D=70 mm and a front mirror radius of curvature R2=620 mm, the fundamental mode beam 46 measures $d_1$=10.7 mm by $d_2$=0.52 mm within gain medium 34, and $d_2$=0.46 mm vertically by 0.52 mm horizontally at out-coupler 32. Different length paths of light rays passing through each prism cause slight non-roundnesses in the area 30 of the output beam. This can be compensated by using another prism or mirror off-axis (not shown), for example as described in "Astigmatically Compensated Cavities for CW Dye Lasers," *IEEE Journal of Quantum Electronics.* vol. QE-8 No. 3, pg. 373 (March 1972).

Figure 3:
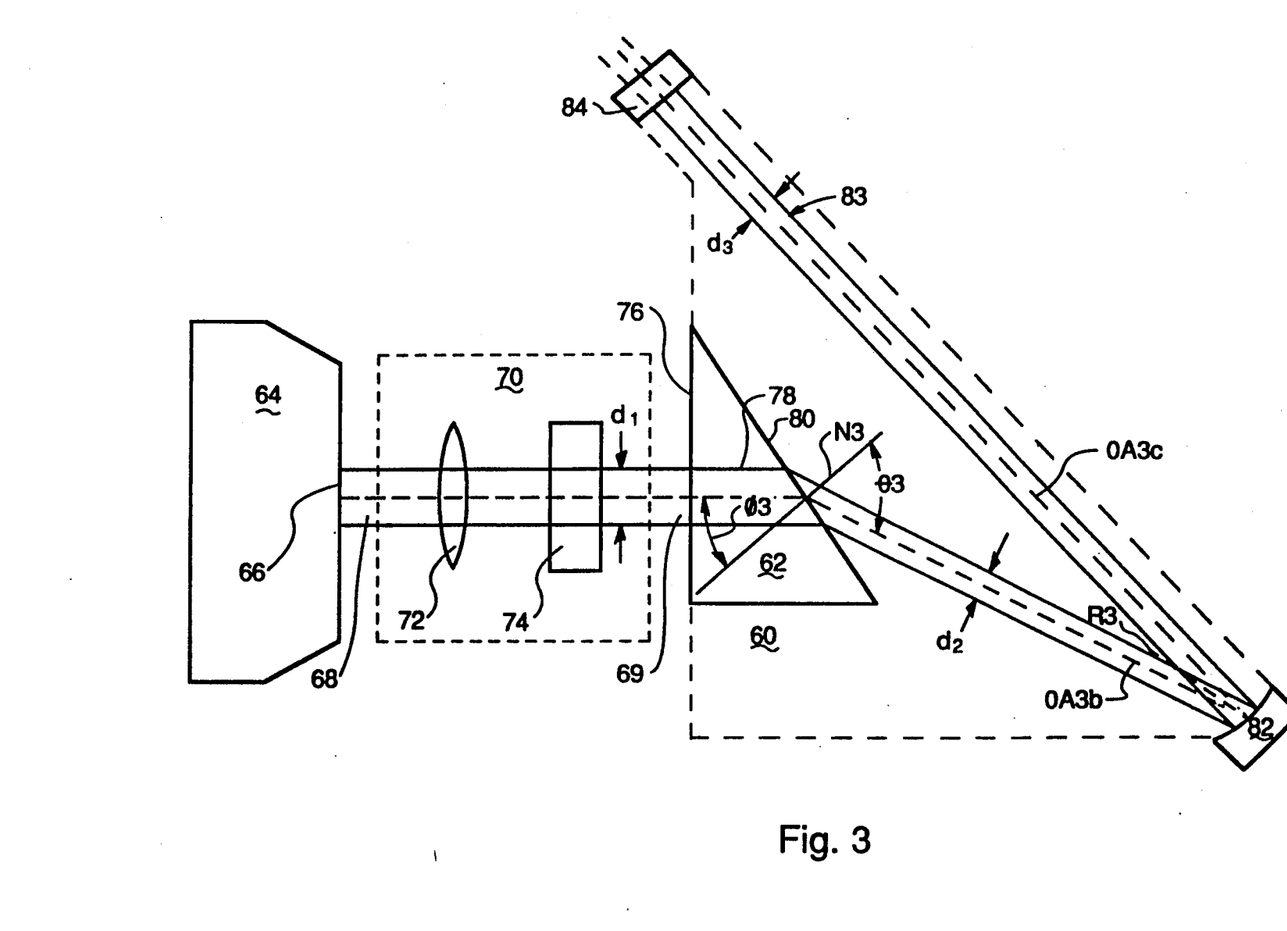
FIG. 3 represents a resonant cavity with a mode beam elongated inside a lasing gain medium which is integrated with an astigmatic element in a single prism.

FIG. 3 shows the invention in a second embodiment, which eliminates a separate solid-state gain element, in an astigmatic cavity 60 using a solid-state gain medium integrated into a large prism 62. A laser diode array 64 (obtained from the Sony Corporation) having a slit 66, between 200 and 600 microns long, pumps light in a beam 68 leftward along axis OA3a into collimating optics 70. Pump beam optics 70, preferably as disclosed in U.S. patent application Ser. No. 343,469, filed Apr. 24, 1989, employ an objective lens 72 followed by a horizontally cylindrical lens 74 through which pump beam 68 is re-shaped and focused as beam 69 towards cavity 60.

Normal-incidence prism 62 has, on its left ("back") end, a dielectric coating back-mirror element 76 which is HT to light at the wavelength received from diode pump 64. Therefore, beam 69 is admitted into a targeted mode volume 78 inside prism 62. Back-mirror element 76 is HR to the wavelength of light eventually lasing from within solid-state gain prism 62.

Short (e.g., 200 micron length) diode slits 66 result in moderately elliptical mode beams 78 which are substantially rounded by exiting at angle $\theta 3$ relative to normal axis N3 from surface 80 of prism 62. Preferably, with $\theta 3$=Brewster's angle surface 80 has no need for an AR coating, and the mode beam diameter ratio $d_1/d_2$ approximately equals the index of refraction "n" of gain medium 62.

Longer (e.g., >600 micron) diode slits 66 result in more elliptical mode beams 78 which can be only partially rounded by incidence at steeper angles $\phi 3$ to interface 80, and afterwards exhibit astigmatism effects which are preferably compensated for by use of another concave mirror 82 off-axis.

A FIG. 3 laser cavity 60 operating with a back-mirror element 76 spaced 210 mm along axis leg OA3b from a compensating mirror 82, which has a radius of curvature R3=400 mm and is spaced 375 mm along axis leg OA3c from a planar out-coupling mirror 84, forms a lasing mode beam 78 measuring $d_1$=450 by $d_2$=300 microns inside prism 62, and a mode beam 83 measuring $d_3$=approximately 800 microns at mirror 84. Mode volume 83 is substantially collimated in the space between mirrors 82 and 84, which can for example accommodate additional optical elements such as a Q-switch, a frequency doubling crystal, or an active mode-locking element (not shown).

Besides configuring cavity modes for lasing light reversibly along linear paths as shown in FIGS. 2 and 3, the present invention can configure cavity modes for lasing light around a polygonal path. Such "ring" lasers are advantageously amenable to "injection locking" into a single longitudinal mode of lasing.

Figure 4:
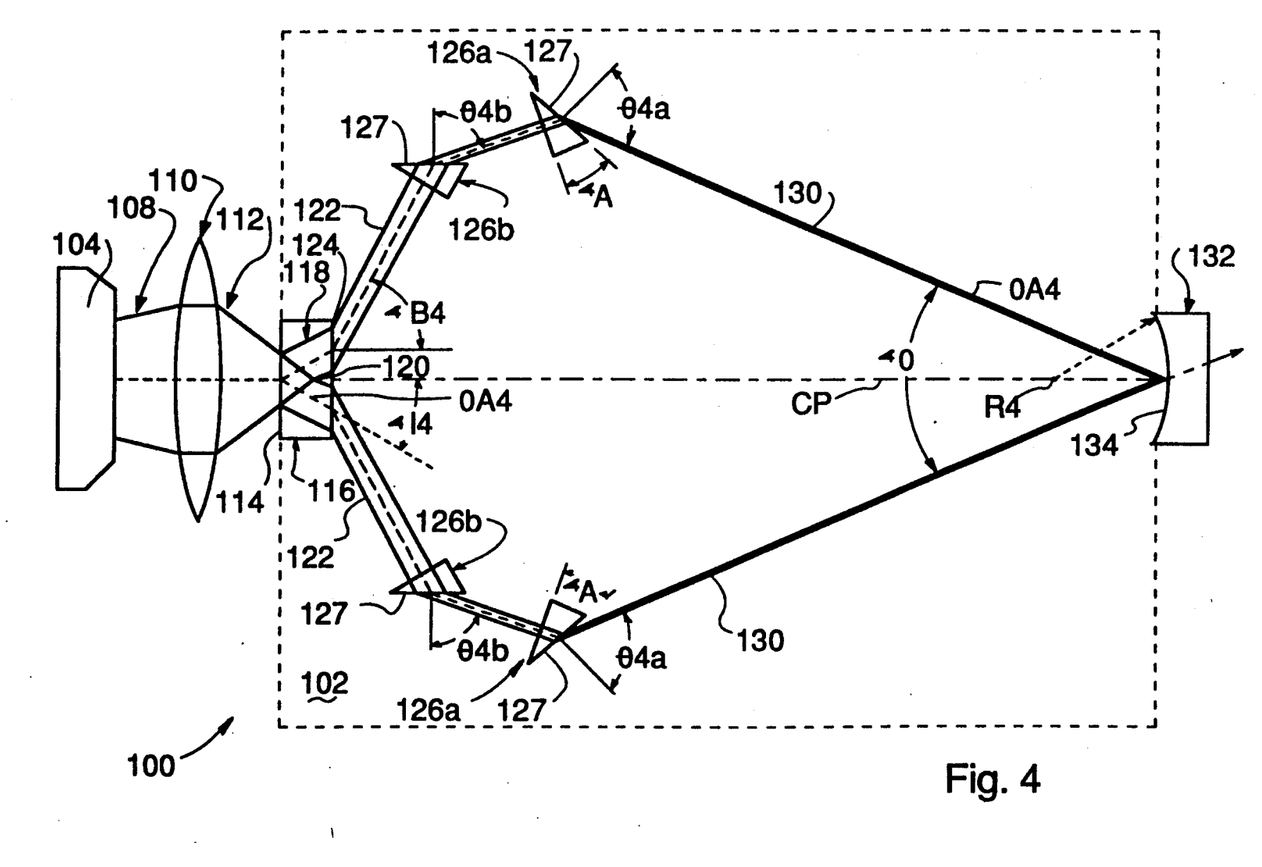
FIG. 4 represents the invention in a preferred embodiment as a ring laser cavity using anamorphic prism pairs to elongate mode beams propagating towards a solid-state lasing gain element.

Referring to FIG. 4, the invention is preferably embodied in a ring laser 100 which is bilaterally symmetrical about a vertical plane CP across cavity 102. Diode bar 104 pumps light (preferably at the 808 nm wavelength) in an elliptical beam 108 through re-shaping optics 110 to be partially collimated into beam 112. Still-elliptical beam 112 arrives at cavity 102 and enters through a back-mirror element 114 adjacent the left end of solid-state lasing gain element 116. Back mirror 114 is a dielectric coating which is highly ($\geq 90\%$) transmissive to wavelengths of light 112 pumped from outside, and highly reflective to wavelengths of light 118 lasing from inside, cavity 102. Solid-state gain element 116 is preferably formed of Nd:YAG and has, measuring from mirror element 114, an absorption depth of four mm along plane CP to the point 120 of separation of cavity mode 122.

Solid-state gain medium 116 lases light 118 at the 1064 nm wavelength which emerges from surface 124 in a mode 122 which is horizontally contracted by respective pairs of prisms 126b and 126a on both sides of centerplane CP into relatively circular mode beams 130 adjacent output coupler 132. Reflected circular mode beams 130 returning leftward are, conversely, horizontally expanded into elliptical mode beams 122. Prisms 126 are preferably un-doped YAG crystals having indices of refraction n=1.82 and apex angles A=31 degrees.

At the right end of cavity 102, the inner surface of out-coupler 132 has a radius of curvature R4=155 mm, and is coated with a front-mirror dielectric 134 which is partially (10%) transmissive to lasing light. Most of the incident light in circular mode beams 130 is reflected by a full angle "O" of 33.2 degrees and is then successively incident at angles $\theta 4a$ and $\theta 4b$=70 degrees with surfaces 127 of respective prisms 126. Re-shaped elliptical beam 122 is incident at angle B4=61.2 degrees (Brewster's angle) from the normal CP to surface 124, which avoids the need for anti-reflection coatings.

Inside gain medium 116, mode beam 122 axis OA4 is incident at angle I4=28.8 degrees from normal plane CP to internally reflecting surface 114, at which elliptical beam 122 appears four mm long. Ring laser cavity 102 has a total optical path OA4 length D=187 mm.

Figure 5S:
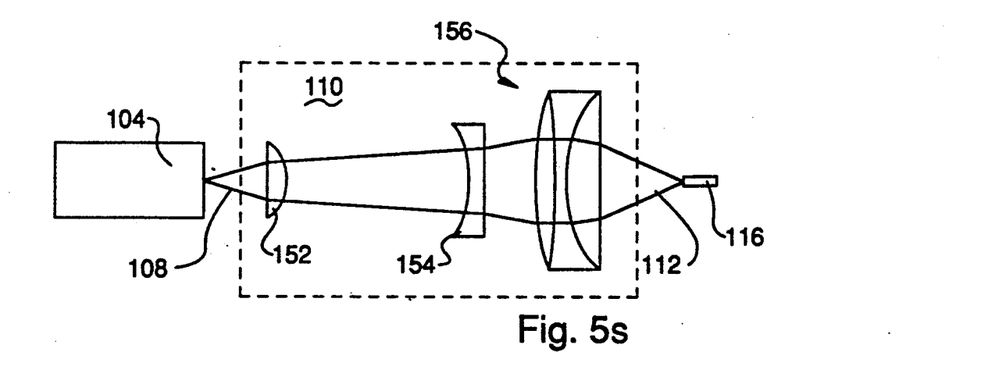
FIGS. 5S and 5T show side and top views, respectively, of pumping light beam optics suitable for use outside the cavity of FIG. 4.
Figure 5T:
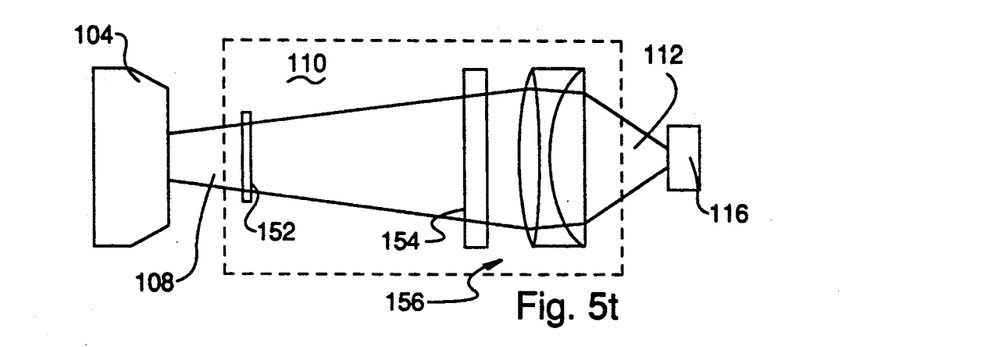

For cavity 102 to be pumped efficiently by a diode bar 104 ten mm long, the length of pump beam 108 must be shortened by beam-shaping optics 110. Suitable optics 110 as detailed in FIGS. 5S and 5T use a cylindrical pick-up lens 152 with f=6.4 mm, a cylinder lens 154 with f=-55 mm, and a spherical doublet lens 156 with f=25 mm. Beam-shaping optics 110 reduce the pump beam 108 vertical divergence typically from fifty degrees down to ten degrees FWHM.

In the FIG. 4 embodiment, re-shaping pump beam 108 also trades off having its horizontal divergence of ten degrees being increased to twenty-five degrees FWHM. However, since cavity mode 122 is reflected from surface 114, this twenty-five degree divergence is well within the useful absorption limits of the fundamental $TEM_{00}$ mode volume inside gain medium 116. Thus, cavity 102 is less restrictive on the divergence of pump light beam 112 than are cavity 28 of FIG. 2 and cavity 60 of FIG. 3.

Cavity 102 forms a mode beam 130 which is only slightly elliptical at output coupler 132, having major (horizontal) and minor (vertical) diameters of 0.49 mm and 0.42 mm respectively. More elliptical mode beam 122 at the back end of cavity 102 has major and minor diameters of 3.52 mm and 0.35 mm respectively.

Figure 6:
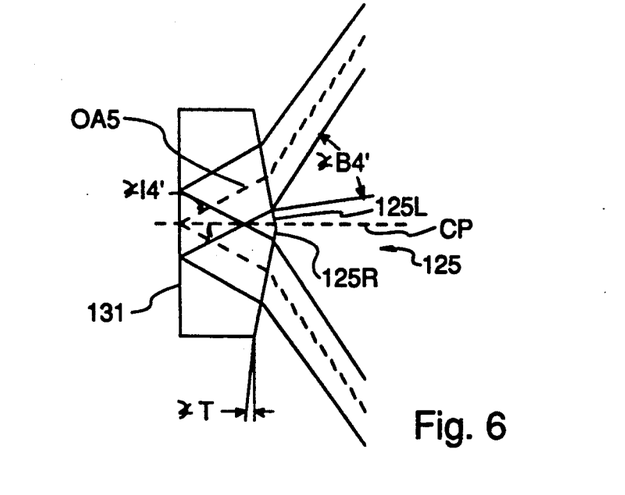
FIG. 6 represents a solid-state lasing gain element in a variation for a cavity similar to that depicted in FIG. 4.

The above parameters are specified for FIG. 4 embodiments using prisms 126 of YAG crystal. FIG. 4 gain element 116 in a variation is reproduced in FIG. 6 wherein cavity-side planar surface 124 is replaced by a surface 125 having two facets 125R and 125L oppositely tilted each by angle $T = \geq 4.6$ degrees, preferably equal to 7.0 degrees, for Nd:YAG. The angle $B4'=61.2$ degrees is still at Brewster's angle, but between optical axis OA5 and centerplane CP the angle $I4'$ is past the critical angle, so surface 131 needs only a simple coating which is anti-reflective at the wavelength of pumping light.

Alternatively, prisms 126 made from a higher refractive index medium, such as tellurium dioxide ($TeO_2$) or strontium titanate, would permit making angles $B4'$ even closer to Brewster's angle, thereby eliminating all need for any anti-reflection coating on the non-normal surfaces. It is also suggested to use less expensive high index optical quality glasses such as LaSF9. Furthermore, it is possible to use other solid-state lasing gain materials such as Nd:YLF, Tm:YAG, or Tm:Ho:YAG in cavities according to the invention. Solid-state lasing gain materials embodied either as individual elements 34 (FIG. 2) or 19 (FIG. 4) as integral element 62 (FIG. 3) should be provided with heat-sinking means.

Figure 7:
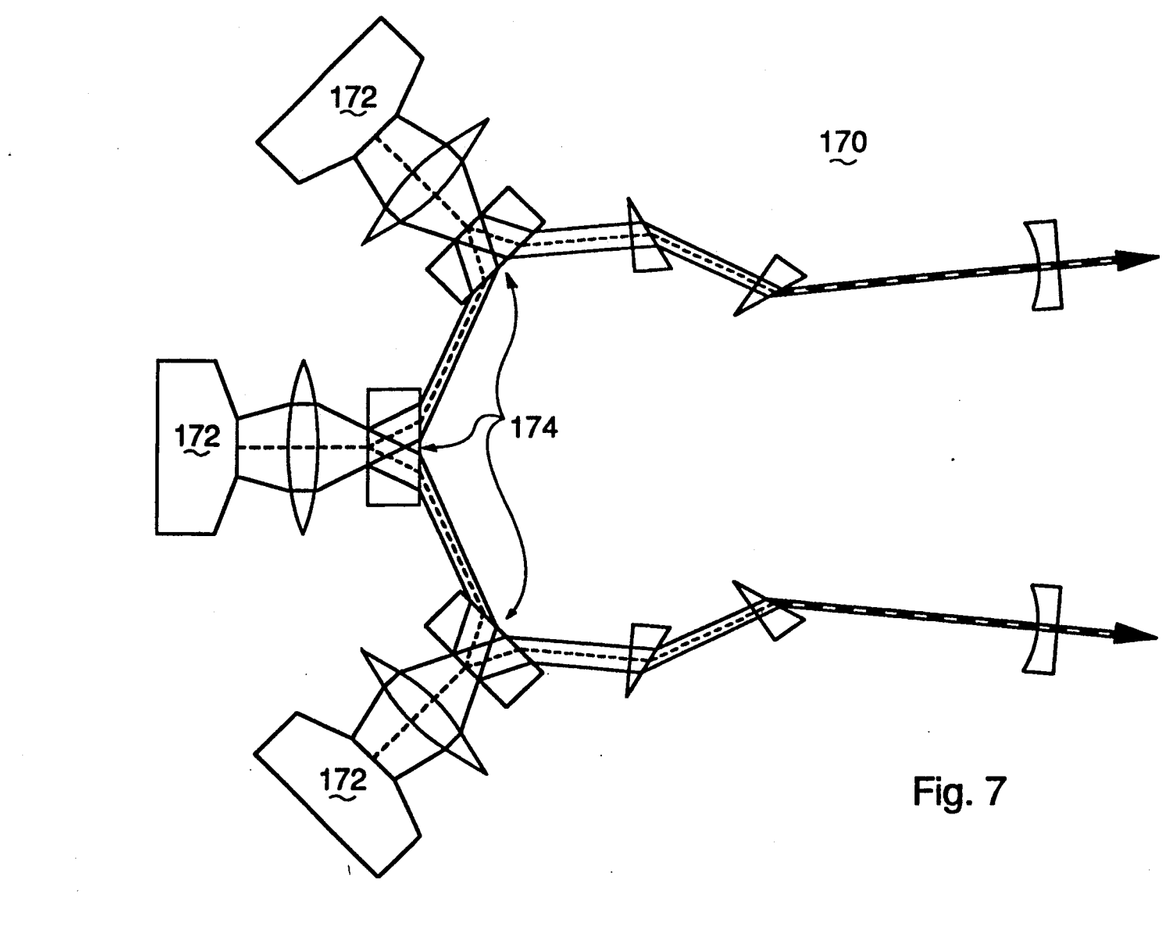
FIG. 7 represents the invention in an embodiment as a linear cavity using a set of three solid-state lasing gain elements from which elongated modes are transformed by anamorphic prism pairs into circular modes adjacent each of two curved mirrors.

Additional laser diode light pumping units may be employed for additional pumping power. FIG. 7 shows a linear cavity configuration 170 using three laser diode sources 172 pumping three Nd:YAG solid-state lasing gain elements 174.

In another alternate embodiment (not shown), a cross-sectionally elliptical mode volume could extend throughout the length of the cavity to output elliptical beams.

While the present invention has been described in terms of several embodiments, those skilled in the art will appreciate that these embodiments may be modified without departing from the essence of the invention. It is therefore intended that the following claims be interpreted as covering any modifications falling within the true spirit and scope of the invention.

We claim:
1. A diode pumped solid-state laser comprising:
   a block of lasing gain material having at least two optical surfaces;
   cavity-forming means positioned around said block to define a laser cavity, said cavity means including mode-shaping means to form an elliptical resonator mode within said block between said optical surfaces;
   a high aspect ratio laser diode pumping light source positioned outside one of said optical surfaces; and
   means to image a pumping light beam from said source to substantially match into said elliptical resonator mode.

2. The laser of claim 1 wherein said cavity-forming means comprises a partially transmissive output-coupler mirror and a highly reflective mirror, and wherein said mode-shaping means comprises one or more anamorphic elements.

3. The laser of claim 2 wherein said anamorphic elements are prisms.

4. The laser of claim 2 wherein said anamorphic element is a single Brewster surface.

5. The laser of claim 2 wherein said resonator mode is a single transverse mode along an optical axis in a straight line between said mirrors.

6. The laser of claim 2 wherein said cavity forms said mode along an optical axis around a ring.

7. The laser of claim 1 wherein said high aspect ratio laser diode pumping light source comprises a laser diode bar including a plurality of separate laser diode arrays.

8. The laser of claim 1 wherein said high aspect ratio is at least 400:1.

9. The laser of claim 1 wherein said gain material comprises Nd:YAG, Nd:YLF, Tm:YAG, or Tm:Ho:YAG.

10. The laser of claim 1 further comprising a frequency doubler positioned within said cavity.

11. The laser of claim 1 further comprising a Q-switch positioned within said cavity.

12. The laser of claim 1 further comprising a mode-locker positioned within said cavity.

13. A Laser means comprising:
   a first mirror element having an outer side and an inner side, and which is highly transmissive to a wavelength of light incident on its outer side from a selected elliptical source of pump light;
   solid-state lasing gain means for receiving pump light through said first mirror element and converting said pump light into lasing light resonating in an elliptical mode on the inner side of said first mirror element; and
   a second mirror element for transmitting a selected percentage of, and reflecting the remaining percentage of, lasing light incident in a beam in said mode.

14. A 355 Laser means as in claim 13 comprising, disposed between said gain means and said second mirror element, anamorphic means for transforming lasing light from said elliptical mode into a relatively circular mode closer to said second mirror element.

15. A Laser means as in claim 14 wherein said anamorphic means configures said cavity for lasing in only one transverse mode.

16. A Laser means as in claim 14 wherein said anamorphic means is oriented off said axis between said solid-state lasing gain medium and said front mirror element.

17. A Laser means as in claim 16 wherein said anamorphic means comprises anamorphic prism means.

18. A Laser means as in claim 16 wherein said anamorphic means comprises a planar surface oriented at an angle non-normal to the incident mode beam axis.

19. A Laser means as in claim 18 wherein said angle is substantially Brewster's angle.

20. A Laser means as in claim 13 wherein said high aspect ratio laser diode means comprises a plurality of laser diode arrays aligned in a long bar.

21. A Laser means as in claim 13 wherein said elliptical source has a high aspect ratio of at least 400 to 1.

22. A Laser means as in claim 13 wherein said resonator means forms a ring laser cavity within which said optical axis forms a polygon.

23. A Laser means as in claim 13 wherein said anamorphic means comprises a front out-coupler with a concave surface having different curvatures in orthogonal dimensions mirroring incident lasing light back through said gain medium.

24. A Laser means as in claim 13 wherein said solid-state gain medium comprises a crystal selected from the group including Nd:YAG, Nd:YLF, Nd:BEL, Tm:YAG, Tm:Ho:YAG, and Nd:glass.

25. A Laser means as in claim 13 wherein said cavity contains a frequency-doubler.

26. A Laser means as in claim 13 wherein said cavity contains a mode-locker.

27. A Laser means as in claim 13 wherein said cavity contains a Q-switch.

28. A Laser means as in claim 13 wherein said gain medium comprises multiple solid-state gain elements.

* * * * *